United States Patent
McNiff

[19]

[11] Patent Number: 6,114,984
[45] Date of Patent: Sep. 5, 2000

[54] INTERFEROMETRIC DOPPLER GUIDANCE SYSTEM

[75] Inventor: Gerald J McNiff, Dix Hills, N.Y.

[73] Assignee: Northrop Grumman Corporation, Los Angeles, Calif.

[21] Appl. No.: 05/642,402

[22] Filed: Dec. 19, 1975

[51] Int. Cl.[7] .............................. G01S 13/72; G01S 13/90
[52] U.S. Cl. ...................... 342/62; 342/25; 342/161; 342/156; 342/48; 342/97; 342/146
[58] Field of Search .................... 343/5 CM, 6 R, 343/7.3, 11 R, 16 R; 342/62, 63, 64, 25, 159, 160, 161, 162, 156, 42, 46, 48, 97, 133, 139, 140, 141, 146

[56] References Cited

U.S. PATENT DOCUMENTS

| | | | |
|---|---|---|---|
| 3,480,957 | 11/1969 | Kosowsky | 343/16 R |
| 3,564,547 | 2/1971 | Dent | 343/7.3 |
| 3,614,778 | 10/1971 | Graham et al. | 343/5 CM |
| 3,778,830 | 12/1973 | Joseph | 343/16 R X |
| 3,945,007 | 3/1976 | Radford | 343/6 R |
| 4,170,774 | 10/1979 | Schaefer | 342/94 |
| 4,194,204 | 3/1980 | Alpers | 342/80 |
| 4,204,210 | 5/1980 | Hose | 342/25 |
| 4,216,472 | 8/1980 | Albanese | 342/95 |
| 4,217,583 | 8/1980 | Hiller et al. | 342/149 |
| 4,227,194 | 10/1980 | Herman et al. | 342/25 |
| 4,264,907 | 4/1981 | Durand, Jr. et al. | 342/53 |
| 4,315,609 | 2/1982 | McLean et al. | 244/3.14 |
| 4,321,601 | 3/1982 | Richman | 342/25 |
| 4,339,752 | 7/1982 | Williams et al. | 342/25 |
| 4,442,431 | 4/1984 | Bleakney | 342/62 |
| 4,533,916 | 8/1985 | Williams | 342/80 |
| 4,788,547 | 11/1988 | Jones et al. | 342/100 |
| 4,993,662 | 2/1991 | Barnes et al. | 244/3.17 |
| 5,805,056 | 10/1979 | Heap et al. | 342/62 |
| 5,805,102 | 9/1998 | Heap et al. | 342/62 |

*Primary Examiner*—John B. Sotomayor
*Attorney, Agent, or Firm*—Terry J. Anderson; Karl J. Hoch, Jr.

[57] ABSTRACT

A means for identifying a particular range and Doppler shift signal in the field of view of a moving radar antenna which determines azimuth angle to this range-Doppler signal relative to the antenna by determining the phase difference between said signal as processed through two channels each fed by antennas displaced in a horizontal direction with respect to the axis of the antenna system.

3 Claims, 1 Drawing Sheet

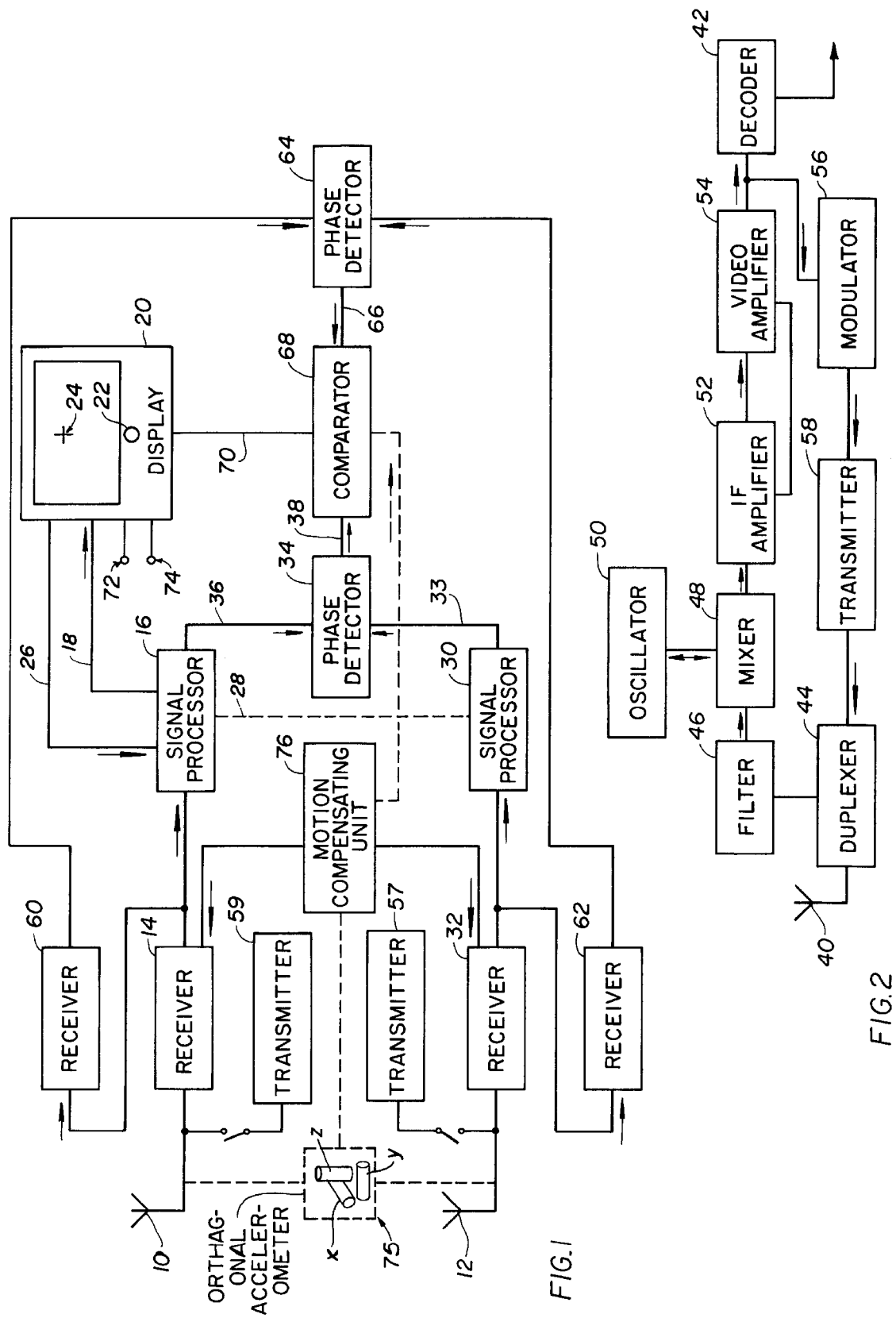

INTERFEROMETRIC DOPPLER GUIDANCE SYSTEM

BACKGROUND

This invention relates to radar search and guidance means and has particular reference to a system using synthetic aperture radar and an interferometric antenna to provide relative range and azimuth information.

A prior art search has revealed by way of U.S. Pat. No. 3,812,493 that it is old in the art of bistatic passive radar apparatus to employ an interferometric antenna to receive signals from a radiating source and via reflection from a target to calculate range and bearing of the target. Such apparatus however depends on the fortuitous illumination of radar significant targets by emitters and detection of the resulting echos at the radar as a means of ranging on such emitters with the use of conventional interferometry for absolute angle measurement. Such a system does not provide for relative observance of a weapon and a target by an airplane as an aid to getting the former to the latter.

U.S. Pat. No. 3,085,242 was also brought to light by a search of the prior U.S. patented art as were some specific foreign publications showing an electronic tracking system where phase differences between antenna pairs in a mutually bisecting antenna baseline system are used to determine direction to multiple transponder targets whose transponder replies may be used for range determination and are sequenced amongst targets. Again there is no ability of determining by a combination of an interferometer antenna and synthetic aperture radar the relative distance and angle between a weapon and a target both a distance from the determining means.

Another prior art U.S. Pat. No. 3,858,211 was discovered that set forth an apparatus whereby slant range and relative bearing to an intruder is determined by secondary surveillance radar in cooperation with transponder-bearing aircraft. In contrast to the interferometric synthetic aperture radar of this invention this reference teaches apparatus which involved ground-based traffic control keyed to the concept of synchronization with a 360° radar search pattern. There is no means provided to obtain both relative range and azimuth information.

U.S. Pat. No. 3,856,237 teaches use of a search radar in a weapon to illuminate a target for an aircraft with which it is synchronized by a transponder signal so that calculations may be made and the weapon guided by the aircraft. However, in contrast to this invention, this patent teaches only a means to illuminate a target from a weapon with apparatus carried by the weapon. Such systems render weapon detection and location much more probable than the passive weapon system of this disclosure. It should be noted that similar prior art teachings with likewise similar distinct differences with this invention are found in U.S. Pat. Nos. 3,074,062 and 3,698,811.

There has also been noted the teaching of U.S. Pat. No. 3,739,378 which is to provide apparatus to specifically determine absolute range and azimuth to an airborne target. In this invention the stated object is to use apparatus to measure relative range and relative azimuth between a cooperative (transponder) missile (weapon) and a non-cooperative or passive ground target.

As this prior art illustrates it is well known to use a weapon such as a guided missile to provide information of its own location and that of a target to a remote station to, at the remote station, guide the weapon to the target. This is also shown by U.S. Pat. No. 3,415,465. Therefore, this general technique is standard and as such is used in IFF and Air Traffic Control. However this art is not illustrative of how one can use a passive weapon (passive in the sense that it does not probe for a target with means that would lead an enemy to believe a threat is presented by the weapon) transponder to, with target mapping by a remote station, obtain information of the weapon's relative range and azimuth to the target.

SUMMARY OF INVENTION

This invention for the most part involves a combination of the synthetic aperture radar with an interferometer antenna system that will compare a transponded signal with a selected target signal to provide information of relative range and azimuth. As such there is used by this invention a combination of radar techniques not heretofore utilized in obtaining the new and different result of providing a signal which can be instrumental in driving a relative range and azimuth separation between a weapon and a target to zero.

With these objects in mind it is the desire in following same to obtain better weapon path to target control in that in bringing the weapon onto a near vertical trajectory above a target, the weapon must by necessity pass through the coordinates of the target even though target elevation information is not available.

DRAWING DESCRIPTION

FIG. 1 shows a block diagrammatic representation of the apparatus aboard an aircraft according to the present invention; and FIG. 2 is a block diagrammatic representation of a typical transponder utilized with the apparatus of FIG. 1 to obtain weapon to target guidance in according with this invention.

DETAILED DESCRIPTION

The unique feature of this invention is, as stated, the use of an interferometer antenna system in conjunction with a synthetic aperture radar signal processor to permit measurement of relative range and azimuth angle between a missile and a ground target which has been designated by an operator on a high resolution real-time synthetic aperture ground map display. This measurement technique is illustrated in block diagram form by FIG. 1.

More particularly, the interferometer system consists of antennas 10 and 12 whose respective phase centers are displaced from one another in the horizontal plane. As will be readily understood by one skilled in the art these may be two physically separate antenna assemblies, or they may be two halves of a single array or other integral antenna assembly. In either case the output of one, say 10, is directed to receiver 14 where it is then communicated to a Doppler Beam Sharpening or Synthetic Aperture Signal Processor 16 and from there provided via line 18 to display 20. Such processor is known to one skilled in the art to take the signal of the receivers and break out of such signal its frequency components representative of range-Doppler bins. Such units have become known prior to this invention as Fast Fourier Transform (FFT) Doppler processors. The signal thus yields at display 20 a target display which, as is known possible from the latter apparatus, can be a high resolution synthetic aperture ground map in real- or near-real-time. The mapping could be enhanced by increasing the aperture with a summation of the two antenna outputs. Actually in one embodiment these antennas are really formed as halves of a single antenna structure.

An operator viewing the imagery on display 20 uses a control 22 to localize cross hairs 24 (cursor) in identifying a target of interest. The control 22 could be the standard weapons control joy stick sometimes referred to as the cursor control. This provides a signal via line 26 that will designate a certain range-Doppler bin, to the signal processor 16. The same designation of coordinates is by means of link 28 transferred to the signal processor 30 operating at the output of a receiver 32 for the second, or auxiliary, antenna 12.

In this processor 20, which is readily familiar to one skilled in the art, an identical range-Doppler filter is implemented, giving rise to the video filter output via line 33 to a phase detector 34. Normally this output is identical to that of the designated range-Doppler filter output via line 36 from processor 16 with the exception of the signal's phase. Actually the phase of signals in lines 32 and 36 differ in accordance with the bearing of the ground target relative to the centerline of the antenna phase centers and the separation between those phase centers.

The phase detector 34, an item also readily available in the market place, measures the relative phase between the range-Doppler filters and provides a signal via line 38 indicative of the angular location of the target.

It should be readily understood that the signal on line 38 does not depend on angular measurement capabilities of the Doppler Beam Sharpening or Synthetic Aperture processing techniques for accuracy. These techniques serve to obtain and isolate in a single detection cell a target wherein interferometer measurement can be made in the absence of interference from surrounding targets and clutter.

With the above apparatus the requirement for an extremely precise and accurate navigation or platform motion sensing system has been avoided with a considerable savings of equipment. If it is desired to have some degree of electronics or mechanical stabilization of the antenna pair during the coherent processing interval, this may be provided as explained hereinafter. Such means would be to ensure that small differences in radial velocities between the target and each antenna do not cause a spatial shift in the designated Doppler filter characteristic, resulting in possible phase decorrelation of an azimuth extended target from processor 16 to processor 30.

To provide as much commonality of error sources as possible between angel measurement (tracking) of the target ad the weapon the same interferometer system is used for both measurements.

A transponder or beacon on the weapon is shown by the apparatus of FIG. 2. As will be appreciated by those skilled in the art such a system includes an antenna 40 interrogated by a signal whose frequency is outside the radar bandwidth, or by the radar transmission itself, and which may receive signals for command decoder 42 activated by a signal passed by duplexer 44 to filter 46 thence via mixer 48 receiving also a pulse from oscillator 50, to IF amplifier 52 and video amplifier 54 to the decoder 42 and a modulator 56. Modulator 56 then sends signals to a transmitter 58 for broadcast by antenna 40 at a frequency identical or nearly identical to that of the radar system. This is not to require that this always be the case as the transponder signal may be outside the band of the radar receiver so long as the magnitude of offset is kept as small as possible.

As will be readily appreciated the transponder may be interrogated by a transmitter 57 at a time interleaved between successive radar transmissions by transmitter 59. Its response is used to measure angular and range location of the weapon (missile). Actually the transponder return is delayed or interleaved in such a way that it arrives at the radar at a time significantly different from that of ground echos although within the same pulse repetition interval of the radar transmission. The return enters the radar's receiver through the two halves of the interferometer to be fed to receivers 60 and 62 to be then compared by a phase detector 64 that transmits a signal via line 66 to a comparator 68 to provide a azimuth error signal via line 70 to the display 20. By subtracting the indicated angle of the weapon from that of the target, baseline dependence will drop out of consideration. Thereby a purely relative measurement of the angle between weapon and target is yielded.

The relative range between target and weapon is measured in a fashion similar to the above for angle processing: i.e. The radar return from the target and the transponder return from the weapon are processed through identical timing circuits and compared such that resulting range separation signals are independent of systematic errors of common circuitry.

The relative range and azimuth error signals can be fed from terminals 72 and 74 to be used to generate guidance commands for the weapon which will steer it onto a near vertical terminal trajectory defined as the locus of points for which the two relative quantities are zero. As is within the ability of those skilled in the art, these commands are sent to the weapon by means of a narrow-band data link, whose mechanization may take advantage of the hardware used to provide the interrogator/transponder function.

In order to accomplish the operation of this system from a moving aircraft, a number of different motion compensating operations can be performed, as referenced above. In the first place, the aircraft is translating through a significant angle subtended at the target during the coherent processing time of the synthetic aperture processor. In order to enhance the azimuth measurement of the target's position, the interferometer antenna system (antennas 10 and 12) may be rotationally stabilized to a line of sight direction to the target. This may be done mechanically, through a gimballed antenna pedestal with orthagonal accelerometer means 75 or electronically by a motion compensating unit 76 that injects successive phase delays into one channel of the interferometer recivers 14 or 32 or both in combination. If desired, inertial sensors on the antennas 10 and 12 could be used to monitor motion and provide signals to correct both the processors 16 and 30 to account for deviations of the antenna phase centers from contours of linear target phase advance along which an uncompensated synthetic aperture radar would have to fly. Such data acquisition and transmission is well known to those skilled in the art and is disclosed in the aforesaid U.S. Pat. Nos. 3,085,242 and 3,812,493 and from the book *RADAR SCANNERS AND RADOMES* (MIT Series) M. B. Karelity et al McGraw Hill 1948. (See pp. 167, 168).

From the foregoing, it will be apparent that this invention deviates from the norm of amplitude monopluse techniques and instead has suggested a system using the phase relationship of multiple doppler channels combined so as to be more effective than they could be independantly in guidance control.

Changes may be made in the combination and arrangement of parts as heretofore set forth in the specification and shown in the drawings, it being understood that any modification in the precise embodiment of the invention may be made within the scope of the following claims without departing from the spirit of the invention.

What is claimed is:

1. A system in which microwave pulses of two distinct types are received through a single pair of spatially separated antennas, uniquely processed according to type for purposes of interference reduction, and then individually phase compared channel to channel so as to determine angular bearings whose difference, by virtue of common-mode error rejection, is a precise measure of the relative angular separation between a mobile cooperative transponder and radar ground reflectors which are the respective sources of the pulses of two distinct types, said system comprising:

two horizontally spaced antennas to receive said microwave pulses of two distinct types to provide signals having a significant phase shift from one of the antennas with respect to the other for pulses at an angle to the bore sight of the antennas;

means to process said pulses said means isolating a phase difference for returns from said ground reflector and isolating a phase difference for signals from said transponder that are due to the angle between the antenna boresight and signal location; and means to compare the phase difference of the return and the signal to provide an azimuth error signal of the return and signal respective positions remote of the system.

2. In a system to identify an area and direct a device theretoward, a means to map an area by synthetic aperture radar and select a target therewithin, said means also during the same time receiving signals from a moving device remote from the system and area, said means comprising:

interferometer antenna means including two antennas displaced from one another in a horizontal plane;

a plurality of receiver means for each antenna of the interferometer antenna means one of which will range echo with its antenna and another of which will receive signals from the moving device to separate range echo returns from the target and signal from the moving device; and means connected to the output of each of the separate receiving means to separate and filter said returns, detect phase lag of said returns and said signals and compare detected phase lag of said returns and signals in the same time interval so as to achieve cancellation of errors by common circuitry for calculation.

3. Means to measure relative range and relative azimuth between a signal from a remote transponder and a radar return from a remote target, said means comprising:

an interferometer antenna having two elements whose respective phase centers are displaced from one another in a horizontal plane;

receiver means for interleaved signals from the remote transponder and the radar return from the remote target, said receiver means having at least two channels, one for each of said elements providing separate outputs of the phase of the signals and return as received by each of the two elements;

first phase detector means to detect and output phase differences of said radar return at said interferometer antenna;

second phase detector means to detect and output phase differences of said signals at said interferometer antenna; and means to compare the phase difference of said radar return and said signals upon receipt of the output from said first and second detector means to provide output signals of the azimuth displacement of the target and transponder that will provide relative angular and range measurement between the transponder and the target.

* * * * *